UNITED STATES PATENT OFFICE.

EMIL BERINGER, OF CHARLOTTENBURG, GERMANY.

PROCESS OF MAKING ZINC SULFID.

SPECIFICATION forming part of Letters Patent No. 666,300, dated January 22, 1901.

Application filed May 31, 1900. Serial No. 18,607. (No specimens.)

*To all whom it may concern:*

Be it known that I, EMIL BERINGER, manufacturer, royal Prussian commercial counselor, a subject of the King of Prussia, German Emperor, residing at 1ª Sophienstrasse, in the city of Charlottenburg, Kingdom of Prussia, and German Empire, have invented a certain new and useful Process for Manufacturing Sulfid of Zinc Suitable for Paints, with Simultaneous Formation of Rhodanates, of which the following is a specification.

This invention has reference to a process for the formation of sulfid of zinc by means of which it is possible to adapt the same to the manufacture of a white-colored substitute for zinc-white, white lead, lithopone, and similar paints of good covering qualities, both in admixture with water and varnishes. This process, which at the same time yields rhodanates or sulfo-cyanids as by-products, is based upon the action of an ammoniacal solution of zinc oxid produced from any suitable zinc salt upon bisulfid of carbon under certain conditions, according to the well-known equation:

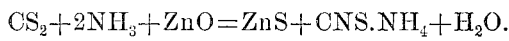
$$CS_2 + 2NH_3 + ZnO = ZnS + CNS.NH_4 + H_2O.$$

I am aware that a process for the manufacture of guanidin salts with sulfid of zinc as a by-product has already been described in German Patent Specification No. 97,820. This process, however, where the guanidin salt is formed by the decomposition of the sulfo-cyanid of ammonia and which is carried on by subjecting the materials to a dry heating process, differs from my invention, inasmuch as it does not disclose means for manufacturing a sulfid of zinc adaptable for painting purposes, the sulfid of zinc being only obtained thereby as a by-product of no commercial importance, and then only in the case of oxid of zinc being used for the heavy metal oxid forming a part of the process referred to. My invention, on the contrary, which avoids the decomposition of the sulfo-cyanid and is carried on in solution, is intended for the manufacture of sulfid of zinc possessing certain valuable properties, while the simultaneous formation of sulfo-cyanids or rhodanates is of but secondary importance in my process, which also avoids the inconveniences and drawbacks of the process heretofore in use resulting from an excessive temperature and from other sources.

In order to produce sulfid of zinc adapted for use as a painting material, it is necessary to avoid any undue rise of temperature and to conduct the process in a closed vessel provided with an agitator, the temperature being rapidly raised above 102° Fahrenheit in order to obviate the formation of sulfo-carbonate of ammonia, which, though it will be decomposed on prolonged boiling, will be sure to impair the physical condition of the sulfid of zinc formed. The process is then conducted, preferably, at a temperature of 212° Fahrenheit, so as to avoid decomposition of the product, which will take place when the temperature is raised too high—say to nearly 300° Fahrenheit, for instance.

In order to carry my invention into effect, I prefer to use a digester with an interior lining of enamel, into which is placed the ammoniacal zinc solution, made up, for instance, of about two hundred and thirty pounds of sulfate of zinc, about one hundred gallons of water, and about two hundred and thirty pounds of ammonia of 0.91 specific gravity. I then add about sixty pounds carbon bisulfid, close the digester, and raise the temperature rapidly to 212° Fahrenheit, keeping the mixture constantly stirred all the time, the pressure rising to sixty pounds by this time. After four hours the pressure begins to decline, while the temperature is maintained at 212° Fahrenheit, and after ten hours' digestion the process is finished, the pressure having gone down to about twenty-two pounds. It may be mentioned that the yield in this process, both of sulfid of zinc and of sulfo-cyanids, is almost theoretical in case of an excess of ammoniacal solution of zinc, salt being employed, as in the above example. After the removal of the sulfid of zinc, which is utilized as a color or paint, the ammonia may be recovered from the sulfo-cyanid of ammonia by treatment with quicklime, forming sulfo-cyanid of calcium, from which hydrocyanic acid may be obtained by treatment with nitric acid. It is obvious that inasmuch as in this process only so much of the ammonia will escape immediate recovery as corresponds to the nitrogen necessary for the formation of the sulfo-cyanid group, and in view of the possibility of recovering even the rest of the nitrogen in the form of hydrocyanic acid, a great advantage, from an economical point of view, is realized over the processes heretofore known, where the ammonia of the ammonia salt of the sulfo-cyanid was also decomposed. The sulfid of zinc thus obtained, which after being freed from the liquor and washed is in a state of very fine distribution, is then dried and ground by porcelain grinders or by any other suitable means.

What I claim, and desire to secure by Letters Patent, is—

A process for the formation of sulfid of zinc suitable for the manufacture of white paints and for the simultaneous formation of rhodanates or sulfo-cyanids, comprising the treatment under pressure and at a temperature not exceeding 300° Fahrenheit of carbon bisulfid by an ammoniacal solution of zinc oxid, the mixture being agitated until the reaction is completed, substantially as described.

In witness whereof I have hereunto signed my name in the presence of two subscribing witnesses.

EMIL BERINGER.

Witnesses:
WOLDEMAR HAUPT,
HENRY HASPER.